Figure 1:
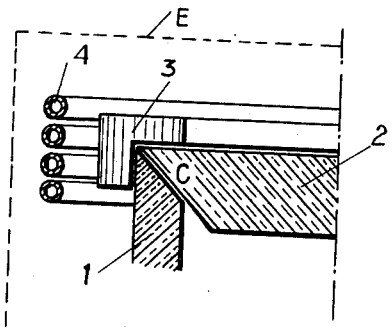

May 11, 1954

A. DANZIN ET AL 2,677,920

TIGHT ENCLOSURES MANUFACTURING

Filed Jan. 17, 1951

INVENTORS
ANDRÉ DANZIN,
PIERRE DUSSAUSSOY, by John B. Brady
ATTORNEY

Patented May 11, 1954

2,677,920

UNITED STATES PATENT OFFICE 2,677,920

TIGHT ENCLOSURES MANUFACTURING

André Danzin and Pierre Dussaussoy, Paris, France, assignors to Compagnie Generale de Telegraphie Sans Fil, a corporation of France Application January 17, 1951, Serial No. 206,348

6 Claims. (Cl. 49—82)

In United States Patent 2,504,504 there is described the method of manufacturing vacuum tight enclosures characterized by the polishing of the constituent parts to an optical degree, and by the use of a vacuum pumping operation prior to the phase of the heat operation. This latter operation was secured under conditions such that the contact between the optically polished surfaces, already perfectly resisting the external pressure in the cold, was converted into solid and permanent solder without this resistance thereby being compromised. The soldering was due to the diffusion of a molecular nature between the optically polished surfaces in close contact, produced at temperatures below that of deformation of the substance of the parts, particularly of glass. It has thus been proposed to regulate the heat treatment in such a way as to attain, on the one hand, this diffusion temperature, and on the other hand, to prevent the parts from reaching a softening or viscous state, which, under the effect of the external atmospheric pressure would have failed to deform the walls and above all to compromise the tightness of the joint.

In the aforesaid patent, there was forseen, by way of an example of a mode of executing this heat treatment, the use of a de-gassing oven regulated at the indicated temperature. This offered the advantage of merging the heat and de-gassing operations of the electrodes into a single operation, and of subjecting the joint to a prolonged heating imposed by the de-gassing, guaranteeing a perfect solder.

However, this mode of execution required a very precise control of the oven temperature, imposed by the necessity of attaining the temperature of diffusion and of not permitting the glass to get the state of deformation; and this control was not always easy to secure and to maintain.

The present invention has as its object a new mode of carrying out the heat treatment which permits of becoming independent of this condition by appreciably enlarging the range of useful temperatures, and particularly of lowering the lower limit of the oven temperature range.

It likewise has as its object variants of making a heating device which is combined with the de-gassing oven.

The invention also permits of considerably reducing the duration of the baking.

According to the invention, the region of the optically polished contact is subjected locally to a temperature appreciably above that of deformation, and in order to avoid all deformation and to maintain the tightness, the duration of this super-heating is limited in such a way that during this peak of heating, the process of molecular diffusion i. e. the phenomenon of the soldering in a solid state is accelerated, without the geometry of the envelope suffering any deformation.

Preferably, the heat application is regulated so as to subject a limited section of the contact to this temperature peak, while maintaining the remainder at the temperature below that of deformation. This latter part of the contact will be heated by conduction effect through the glass mass, at the temperature causing the molecular diffusion. This section will be thus converted into a permanent sealing according to the process described in the above-mentioned patent. As no sinking effect will be produced at this spot, the enclosure will strictly retain its initial geometry, which is very important in the manufacture of tubes in which the positioning of the different sections of the tight enclosure determines the geometry of the electrodes.

Since the heating temperature is appreciably above the temperature limit of molecular diffusion, and since it can, under these conditions undergo without disadvantage, relatively large variations, the control of it proves to be very much simplified.

The heat operation may be advantageously combined with that of the baking, and executed with means connected with the oven, such as a heating device by high frequency induction placed in the oven, and of which the inductor will be placed in the neighborhood of the joint.

As has already been indicated in the aforesaid patent, the glass parts should be subjected to an annealing prior to the polishing, in order to eliminate in their mass all stress, the relaxing of which, during the heat operation, risks compromising the tightness of the joint during this heat operation. If internal stresses still existed in the glass during this heat operation, the relaxing of these stresses would risk deforming the surfaces and thus compromising the hermetic contact.

The accompanying drawing, showing by way of non-limiting example, modes of carrying out the invention, will make the heat process and its consequences more understandable.

Figure 1A:
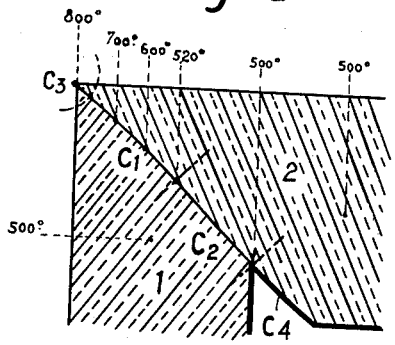
Figure 2:
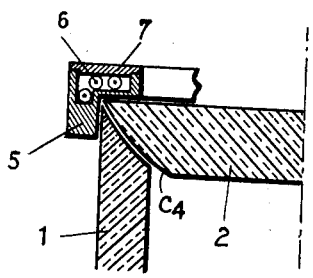

In the drawing Figure 1 shows the heating device operated by high frequency induction used to seal two glass parts forming part of an emptied envelope; Fig. 1a shows an enlarged section of the zone of contact and the temperature gradients prevailing in the region of the joint; and Fig. 2 shows one variant of making the heating device.

After the glass parts 1 and 2, belonging respectively to the lateral wall and to the base of an electron discharge or cathode ray tube have been optically polished and dressed on the contact surfaces C, they are applied one against the other and placed inside the oven E, indicated symbolically by the dotted line, where they are subjected to the pumping action. This latter is continued until the achievement of a high vacuum inside of the enclosure, the tightness of which is assured by the close adherence in the cold of the contact surfaces.

Then, and this comprises the characteristic of the present invention, the heating device formed by the high frequency induction coil 4 is made to intervene, inducing Foucault currents in a short circuit winding 3 of graphite surrounding the joint, and in its immediate vicinity. The temperature of this winding 3 is regulated by means which are not shown, acting on the high frequency electromagnetic energy supplied to this winding by its coupling with the inductor, in such a way as to attain at the level of the winding in contact with the joint, a temperature of about 800° C. On the other hand, the duration of this treatment is limited in such a way as not to exceed a fraction of a minute, and particularly 15-30 seconds.

This action is combined with the baking operation bringing the whole of the emptied enclosure to a temperature of about 500° C. Under these conditions the temperature gradients in the glass mass would approach the distribution indicated on Fig. 1a. One portion $C_1$ of the contact between the surfaces of the joint will undergo a momentary super-heating, as will the corresponding part of the envelope, whereas the zone $C_2$ of contact will have a temperature gradient going from 520° to 500° C., as will the surrounding sections of the glass.

Under the conditions of the distribution of temperatures as shown, the zone $C_2$ of contact will have exceeded the temperature of superficial molecular diffusion which characterizes the sealing in a solid state, which is on the order of 480-500° C., but will be below the temperature of deformation of the glass (approximately 520° C.). It will thus be subjected exactly to the heat conditions of sealing in the aforesaid patent, and will be converted into a tight solder, without there being produced the slightest deformation at this spot, nor the slightest sinking of the edges. The zone $C_1$ will be subjected to a heating exceeding the temperature of deformation; however, this super-heating will not react on the conditions of the contact between the glass surfaces in this zone, since these surfaces will remain in close contact and will retain their mutual portions because of the rigorous keeping in place of the lips in zone $C_2$. Under these conditions the peak of temperature, of very short duration, to which the zone $C_1$ will be subjected, will only intensify and accelerate the soldering process between its lips, without influencing their positioning.

In a very small zone $C_3$ the surfaces in contact could reach a viscous state and lose their adhesive faculty, but the solders at $C_1$ and especially at $C_2$ will keep the joint tight and cause the parts to retain their strict positioning. Whatever the transformations of state which the zone $C_3$ could possibly undergo, subjected to said peak of super-heating, the zone $C_2$ will always assure the intimate contact between the lips of the joint, will cause it to keep its tightness, and will strictly guarantee the initial positioning of the parts of the envelope.

The temperature of the principal mass of glass will not reach that of deformation, and no deformation of the parts, dangerous for the maintenance of the vacuum and the positioning of the electrodes, is to be feared.

It is to be understood that the temperature of the oven could be held at a level below 500° C. i. e. that of molecular diffusion, and only sufficient to satisfy the de-gassing conditions. The only critical condition will be not to reach the state of deformation of the glass. In this case, only the action at the peak of the high frequency inductor will assure the solder, and will be regulated in such a way as to subject the largest part of the contact to the temperature which permits diffusion. It is often wise to place the heat phase of the soldering in the center of the baking operation, in order to avoid any danger of mechanical stresses in the mass of the glass introduced by the peak of super-heating.

Under certain conditions, one will precede this baking operation with the super-heating operation, so as not to merge the heat applications of the two operations. It will be done particularly in order to close the glass tubes of low expansion coefficient, which offer a sufficient resistance to heat shock.

In freeing the baking operation of all lower temperature limitation, which, before, was imposed by the diffusion phenomenon, one removes it from the necessity of a strict heat control, often difficult to effect, whereas the control of the temperature and the duration of the action of the super-heating winding can be conveniently assured by the high frequency electric circuit.

The invention is particularly useful for applications to rotary machines for automatic manufacture of vacuum tubes. The high frequency inductor or any other super-heating device will then be placed in the middle of the baking passage and its use will permit, particularly, in the case of tubes not requiring a very extreme degassing, of reducing the duration of the baking from approximately two hours to a quarter of an hour.

In Fig. 2, in which the glass parts to be soldered together are designated as before by 1 and 2, the heating device has a case 5 of refractory substance, not adhering to the glass at 800-1000° C., such as steel, placed against the edge of the joint. Inside of this case, shown in section and surrounding the entire circumference of the tube, of which only a fraction is shown, there is placed a heating resistance 6 made of resistant wire wound as a coil. A lid 7 permits of its being put into place and of being inspected. The temperature is controlled by simply acting on a feed rheostat in current of this resistance.

It is to be noted that since all the portion $C_4$ of the optically polished surface is outside of the solder, and since it has not been subjected to the heating which transforms its state, it will retain its initial polished appearance. It should also be noted that the sharp angle which the section $C_4$ forms with the other part retains its appearance determined by the initial polishing. Instead of giving to the contact surfaces a straight plane shape, in many cases, in order to facilitate the manufacture, they will be given a slight curvature, as shown in Fig. 2. The surface of one of the parts will be convex, the surface of the other will have a concave profile, exactly fitting the profile of the first part. These profiles are obtained by friction (as well during the course of the grinding operation as during that of polishing) against an appropriate spherically shaped body. This latter will in most cases be driven by a rotary movement.

The mode of heating which is the object of the present invention, is not of course, limited to joints such as those shown, formed by parts of the envelope in direct contact; but it also applies to the sealings described in copending application Serial Number 206,347, filed January 17, 1951 by Pierre Dussaussoy and Maxime Grivot for "New Manufacture Process of Tubes or Vacuum Envelopes," in which there are introduced into the joint thin layers of silver covering the parts, polished and in intimate contact with them. This mode of heating can be applied in a general fashion in all cases in which it is a question of converting a hermetic and intimate contact between surfaces polished to a high degree, and having complementary mating profiles into a permanent tight soldering.

While we have described our invention in certain preferred embodiments we realize that changes and modifications may be made and we desire that it be understood that no limitations upon our invention are intended other than may be imposed by the scope of the appended claims.

We we claim as new and desire to secure by Letters Patent of the United States, is as follows:

1. A method for making permanent tight joints between glass parts of hermetic high vacuum envelopes, consisting of annealing said glass parts, polishing the mating edges of said parts to provide a zone of hermetic contact, locally heating said zone of contact to seal the same, and limiting said heating in temperature and duration to raise a portion only of said zone of contact to the temperature of deformation of the glass, while raising an immediately adjacent portion of said zone to the temperature of sealing in a solid state without exceeding it.

2. A method for making a permanent tight joint in a high vacuum envelope between glass parts having mating edges consisting in surfacing said mating edges to provide a single zone of hermetic contact, locally heating said zone of hermetic contact by bringing a source of heat into close proximity with said single zone of contact, and sealing the joint by applying a peak of heat from the heating source to the said zone of contact, the peak of temperature reaching above the deformation temperature of the glass and the duration of heating being limited to prevent the penetration of the deformation temperature inwardly of the zone of contact beyond a portion only of said zone of contact while an immediately adjacent portion of said contact remains in the solid state but reaches the temperature at which it seals by the effect of the superficial molecular diffusion between edges in hermetic contact relation.

3. A method of manufacturing a high vacuum envelope consisting of imparting an optical polish to the mating edges of glass elements of said envelope to form a hermetic contact zone, baking and degassing said elements in a degassing oven, and sealing said contact zone by locally heating said zone within said degassing oven, the heating being increased in temperature to a peak above the deformation temperature of the glass and again decreased below that temperature with the duration of the heating peak controlled to limit penetration of the deformation temperature inwardly of the contact zone to a portion only of said zone, while an immediately adjacent portion of said zone remains in the solid state.

4. A method for making permanent tight joints between glass parts having mating edges in hermetic contact, said parts being elements of a high vacuum envelope, said method consisting of sealing said mating edges by raising to a peak the temperature of a heating body surrounding said hermetic contact and again decreasing said temperature, and limiting the amplitude and duration of said temperature peak to raise an outer portion of said hermetic contact to the deformation temperature of the glass while raising an immediately adjacent portion of said contact to the temperature of sealing in a solid state without exceeding it.

5. A method of manufacturing a high vacuum envelope consisting of imparting an optical polish to the mating edges of glass elements of said envelope to form a hermetic joint, baking and degassing the said elements in a degassing oven, locally heating said hermetic joint within said degassing oven so as to apply to the external face of said joint a peak of heat above the deformation temperature of the glass to seal said mating edges together, the amplitude and the duration of the heating above said temperature being limited to prevent the penetration of the deformation temperature inwardly of the joint beyond the outer portion of the contacting edges of said elements and leaving the immediately adjacent portion of said sealed edges in the solid state.

6. A method for making permanent tight seals between glass parts of hermetic high vacuum envelopes, consisting of surfacing the mating edges of said parts to provide a continuous zone of hermetic contact, locally heating said zone of contact to seal the same, and limiting said heating in temperature and duration to raise a portion only of said zone of contact to the temperature of deformation of the glass, while raising an immediately adjacent portion of said zone to the temperature of sealing in a solid state without exceeding it.

References Cited in the file of this patent

UNITED STATES PATENTS

| Number | Name | Date |
|---|---|---|
| 1,206,177 | Twyman et al. | Nov. 28, 1916 |
| 1,796,401 | Sample | Mar. 17, 1931 |
| 2,268,670 | Ronci | Jan. 6, 1942 |
| 2,333,186 | Landesman et al. | Nov. 2, 1943 |
| 2,504,504 | Despois | Apr. 18, 1950 |

FOREIGN PATENTS

| Number | Country | Date |
|---|---|---|
| 536,858 | Great Britain | May 29, 1941 |
| 582,566 | Great Britain | Nov. 29, 1946 |